US008609759B2

(12) United States Patent
Fasano et al.

(10) Patent No.: US 8,609,759 B2
(45) Date of Patent: Dec. 17, 2013

(54) COATING COMPOSITION WITH HIGH PIGMENT VOLUME CONTENT OPAQUE POLYMER

(71) Applicant: Rohm and Haas Company, Philadelphia, PA (US)

(72) Inventors: David Michael Fasano, Maple Glen, PA (US); John William Hook, Warmister, PA (US); Qing Zhang, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/644,188

(22) Filed: Oct. 3, 2012

(65) Prior Publication Data
US 2013/0085222 A1 Apr. 4, 2013

Related U.S. Application Data

(60) Provisional application No. 61/542,311, filed on Oct. 3, 2011.

(51) Int. Cl.
*C08K 9/10* (2006.01)
*C08J 3/00* (2006.01)

(52) U.S. Cl.
USPC ............ 524/500; 524/522; 524/556; 523/210

(58) Field of Classification Search
USPC .......... 523/210; 524/500, 522, 556, 589, 606; 427/385.5
See application file for complete search history.

(56) References Cited

U.S. PATENT DOCUMENTS

| | | | |
|---|---|---|---|
| 4,421,660 A | 12/1983 | Solc Nee Hajna | |
| 4,427,836 A | 1/1984 | Kowalski et al. | |
| 4,468,498 A | 8/1984 | Kowalski et al. | |
| 4,474,910 A | 10/1984 | Smith et al. | |
| 4,594,363 A | 6/1986 | Blankenship et al. | |
| 4,659,781 A * | 4/1987 | Okude et al. | 525/279 |
| 4,677,003 A | 6/1987 | Redlich et al. | |
| 4,920,160 A | 4/1990 | Chip et al. | |
| 5,215,668 A * | 6/1993 | Bhattacharyya et al. | 210/712 |
| 5,509,960 A | 4/1996 | Simpson et al. | |
| 5,510,422 A | 4/1996 | Blankenship et al. | |
| 6,080,802 A | 6/2000 | Emmons et al. | |
| 6,214,467 B1 | 4/2001 | Edwards et al. | |
| 7,081,488 B2 | 7/2006 | Bardman et al. | |
| 7,179,531 B2 | 2/2007 | Brown et al. | |
| 2002/0016405 A1 * | 2/2002 | Friel et al. | 524/501 |
| 2003/0018103 A1 | 1/2003 | Bardman et al. | |
| 2009/0162558 A1 | 6/2009 | Bardman et al. | |
| 2010/0298483 A1 | 11/2010 | Allen | |
| 2010/0317753 A1 | 12/2010 | Keefe et al. | |

FOREIGN PATENT DOCUMENTS

| | | |
|---|---|---|
| EP | 113435 A2 | 7/1984 |
| EP | 2253676 A1 | 11/2010 |
| WO | 2006037161 A1 | 4/2006 |

* cited by examiner

*Primary Examiner* — Hannah Pak
(74) *Attorney, Agent, or Firm* — Reid S. Willis

(57) ABSTRACT

The present invention relates to a latex composition comprising a) an opaque polymer having a pigment volume concentration of from 18 to 28; b) fully or partially polymer encapsulated $TiO_2$ particles having a pigment volume concentration of from 8 to 18; c) an extender having a pigment volume concentration of from 0 to 10; d) a binder; e) a thickener; and f) water. Notwithstanding the surprisingly high pigment volume concentration of opaque polymer, the composition—upon application to a substrate—gives a coating with a gloss or semi-gloss finish, excellent hiding, and acceptable burnish resistance.

8 Claims, No Drawings

COATING COMPOSITION WITH HIGH PIGMENT VOLUME CONTENT OPAQUE POLYMER

BACKGROUND

The present invention relates to coatings formulations with relatively high opaque polymer pigment volume concentration (PVC) in combination with fully or partially polymer encapsulated $TiO_2$ particles and relatively low levels of extender.

In the paint industry, formulators rely on $TiO_2$ as a pigment to achieve excellent hiding characteristics; nevertheless, the high cost of $TiO_2$ has motivated formulators to seek ways of improving its efficiency. One approach is to use a lower concentration of $TiO_2$ in conjunction with opaque polymer, which is known to provide equivalent hiding but at a lower cost. Unfortunately, as disclosed in U.S. Pat. No. 4,474,910, unless opaque polymer is used in small amounts, burnish resistance of the final paint formulation suffers.

The addition of a coarse extender such as silica or calcium carbonate provides a way of increasing burnish resistance in paints containing opaque polymer at a pigment volume concentration (PVC) that would otherwise produce unacceptable burnish resistance. However, the presence of an extender flattens the appearance of the coated paint, thereby limiting the formulator to making either flat paints with relatively high levels of opaque polymer, or a gloss or semi-gloss paint with relatively low levels (<15 PVC) of opaque polymer. It is therefore desirable to find a way to increase the amount of opaque polymer that can be used in a gloss or semi-gloss paint formulation while maintaining acceptable burnish resistance.

SUMMARY OF THE INVENTION

The present invention addresses a need by providing a latex composition comprising
a) an opaque polymer having a pigment volume concentration of from 18 to 28;
b) fully or partially encapsulated $TiO_2$ particles having a pigment volume concentration of from 8 to 18;
c) an extender having a pigment volume concentration of from 0 to 10;
d) a binder;
e) a thickener; and
f) water;
with the proviso that the sum of pigment volume concentrations of opaque polymer and $TiO_2$ is not more than 40.

Notwithstanding the surprisingly high levels of opaque polymer in the composition of the present invention, the composition—upon application to a substrate—gives a coating with a gloss or semi-gloss finish, excellent hiding, and acceptable burnish resistance.

DETAILED DESCRIPTION OF THE INVENTION

The present invention provides a latex composition comprising
a) an opaque polymer having a pigment volume concentration of from 18 to 28;
b) fully or partially polymer encapsulated $TiO_2$ particles having a pigment volume concentration of from 8 to 18;
c) an extender having a pigment volume concentration of from 0 to 10;
d) a binder;
e) a thickener; and
f) water;
with the proviso that the sum of pigment volume concentrations of opaque polymer and $TiO_2$ is not more than 40.

Opaque polymers are spherical polymers having sufficiently strong shells to retain one or more voids or channels upon drying. An example of an opaque polymer is an aqueous emulsion of styrene/acrylic beads. The beads are filled with water, and when the composition containing the opaque polymer is applied as a coating onto a substrate, the water diffuses from the center of the beads and is replaced by air, resulting in discrete encapsulated voids. Examples of commercially available opaque polymers include ROPAQUE™ Opaque Polymers or ROPAQUE™ Hollow Sphere Pigments (A Trademark of The Dow Chemical Company or its Affiliates). Other examples of opaque polymers are disclosed in U.S. Pat. No. 4,427,836; U.S. Pat. No. 4,468,498; U.S. Pat. No. 4,474,910; U.S. Pat. No. 4,594,363; U.S. Pat. No. 4,677,003; U.S. Pat. No. 4,920,160; U.S. Pat. No. 5,510,422; U.S. Pat. Pub. 2009/0162558A1; and U.S. Pat. Pub. 201010317753A1.

The composition of the present invention further includes fully or partially polymer encapsulated $TiO_2$ particles. Partially polymer encapsulated $TiO_2$ particles include latex particles adsorbed onto the surface of $TiO_2$ particles. Suitable adsorbing latexes include acrylic, styrene-acrylic, vinyl ester, and ethylene-vinyl ester containing latexes. Acrylic latexes preferably contain structural units of acrylates and methacrylates such as methyl methacrylate, ethyl methacrylate, ethyl acrylate, butyl acrylate, and ethyl hexyl acrylate and combinations thereof. Examples of vinyl ester latexes are vinyl acetate latexes; examples of vinyl ester-ethylene latexes are vinyl acetate-ethylene latexes.

As used herein, the term "structural units" is used to refer to the groups formed from the polymerization of the corresponding monomer. Thus, a structural unit of methyl methacrylate is as illustrated:

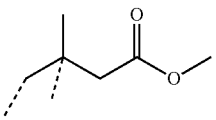

where the dotted lines indicate the points of connectivity to the polymer backbone.

The adsorbing latex further includes an adsorbing moiety, which is a functional group pendant to the polymer backbone that adsorbs to the surface of the $TiO_2$ particles. It is understood that $TiO_2$ particles may be surface treated with metal oxides such as alumina, silica, and zirconia oxides and combinations thereof. Thus, the adsorptivity of the surface of the $TiO_2$ particles varies with the nature of the surface treatment.

Typically, the adsorbing moiety includes structural units of an acid monomer, such as a carboxylic acid containing monomer or a phosphorus acid containing monomer. Examples of suitable carboxylic acid monomers include acrylic, methacrylic, and itaconic acid. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkylmethacrylates, including phosphoethyl methacrylate and phosphopropyl methacrylate, with phosphoethyl methacrylate being especially preferred. Phosphorus acid-containing monomers are preferably used at a concentration in the range of from 0.1 to 5 weight percent, based on the weight of the pre-composite.

Descriptions of partially polymer encapsulated polymers can be found, for example, in U.S. Pat. No. 5,509,960; U.S. Pat. No. 6,080,802; U.S. Pat. No. 6,214,467; U.S. Pat. No. 7,179,531; U.S. Pat. No. 7,081,488; and U.S. Pat. Pub. 2003/0018103A1. Examples of commercially available partially polymer encapsulated $TiO_2$ particles include EVOQUE™ Precomposite Polymers (A Trademark of The Dow Chemical Company or its Affiliates). When only partially polymer encapsulated $TiO_2$ particles are used in the composition, the preferred opaque polymer PVC is from 18 to 22, more preferably from 19 to 21; and the PVC for the partially polymer encapsulated $TiO_2$ particles in from 13 to 17; more preferably from 14 to 16.

Examples of fully polymer encapsulated $TiO_2$ particles are described in U.S. Pat. No. 4,421,660; U.S. Pat. Pub. 2010/0298483, and EP1802662. A preferred general process for fully encapsulating $TiO_2$ particles in a polymer comprises the steps of a) forming a mixture of i) an aqueous dispersion of $TiO_2$ particles and an amphoteric polymer; ii) an anionic surfactant; and iii) sodium styrene sulfonate; b) adding to the mixture of step (a) a redox initiator system; then c) adding an aqueous dispersion of a first monomer selected from the group consisting of a (meth)acrylate monomer; a styrene monomer; a vinyl ester; a combination of (meth)acrylate and styrene monomers; a combination of (meth)acrylate and vinyl acetate monomers; and a combination of vinyl ester and ethylene monomers; and d) polymerizing the first monomer to form an aqueous dispersion of a first polymer that encapsulates the $TiO_2$ particles.

It may be further desirable to include the following steps after step d): e) adding to the mixture an aqueous dispersion of a second monomer selected from the group consisting of a (meth)acrylate monomer; a combination of (meth)acrylate and styrene monomers; a combination of (meth)acrylate and a vinyl ester monomers; and a combination of vinyl ester and ethylene monomers; and f) polymerizing the second monomer to form an aqueous dispersion of a second polymer that at least partially encapsulates the first polymer.

The amphoteric polymer, which adsorbs to the surface of the $TiO_2$ particles, is a polymeric dispersant for $TiO_2$ particles that contains amine functionality and acid functionality, preferably a polymer that is prepared from the copolymerization of an ethylenically unsaturated amine functional monomer and an ethylenically unsaturated sulfur-acid functional monomer. Examples of suitable ethylenically unsaturated amine functional monomers include dimethylamino ethyl (meth)acrylate, dimethylamino propyl(meth)acrylamide, and t-butylamino ethyl(meth)acrylate, with dimethylamino ethyl (meth)acrylate being preferred. Examples of suitable ethylenically unsaturated sulfur-acid functional monomers include sulfoethyl(meth)acrylate, sulfopropyl(meth)acrylate, styrene sulfonic acid, vinyl sulfonic acid, and 2-(meth)acrylamido-2-methyl propanesulfonic acid, and salts thereof, with 2-(meth)acrylamido-2-methyl propanesulfonic acid and sulfoethyl methacrylate being preferred. As used herein, the term "(meth)acrylate" refers to either acrylate or methacrylate; the term "(meth)acrylic" refers to acrylic or methacrylic; and the term "(meth)acrylamide" refers to acrylamide or methacrylamide.

Suitable anionic surfactants include sodium dodecylbenzene sulfonate (SDS) or dodecyl allyl sulfosuccinate. It is understood that the term "a first monomer" is used to refer to one or more monomers; similarly, "an aqueous dispersion refers to one or more aqueous dispersions; thus, a (meth) acrylate monomer refers to one or more (meth)acrylate monomers. The first monomer is preferably either a) a (meth) acrylate monomer; or b) (meth)acrylate and styrene monomers; or c) (meth)acrylate and vinyl acetate monomers; or d) vinyl acetate and ethylene monomers.

The term "redox initiator system" refers to a combination of a reducing agent, an oxidizing agent, and a metal ion catalyst. Examples of suitable oxidizing agents include persulfates such as ammonium and alkali metal persulfates; hydroperoxides, such as t-butyl hydroperoxide and cumene hydroperoxide; peroxides such as benzoyl peroxide, caprylyl peroxide, and di-t-butyl peroxide; peresters such as t-butyl peracetate, t-butyl perphthalate, and t-butyl perbenzoate; percarbonates; and perphosphates; with t-butyl hydroperoxide being preferred.

Examples of suitable reducing agents include ascorbic acid, isoascorbic acid, malic acid, glycolic acid, oxalic acid, lactic acid, and thioglycolic acid; an alkali metal hydrosulfite such as sodium hydrosulfite; a hyposulfite such as potassium hyposulfite; or a metabisulfite such as potassium metabisulfite; and sodium formaldehyde sulfoxylate.

Suitable accelerators include halide and sulfate salts of cobalt, iron, nickel, and copper, used in small amounts. An example of a preferred redox initiator system is t-butyl hydroperoxide/isoascorbic acid/$Fe^{+2}$. Preferably, the accelerator is added prior to the addition of the oxidizing and reducing agents. It is further preferred that the oxidizing and reducing agents are added over time to maintain a relatively even level of radical flux over the course of the addition of monomers.

The dispersion of $TiO_2$ and the amphoteric polymer are advantageously prepared by slowly adding, with concomitant grinding, the $TiO_2$ to an aqueous dispersion of the amphoteric polymer. The preferred solids content of the $TiO_2$/amphoteric polymer dispersion is in the range of 70 to 80 weight percent based on the weight of $TiO_2$, amphoteric polymer, and water.

For coatings applications, it is desirable to prepare encapsulating polymers that are film-forming at ambient temperatures; that is to say, the nature and relative concentrations of monomers are selected to yield first polymers having a $T_g$ of preferably not more than 20° C., more preferably not more than 10° C., and most preferably not more than 0° C.; and preferably not less not less than −40° C., and more preferably not less than −30° C., as determined by Fox equation. (See *Bulletin of the American Physical Society* 1, 3 Page 123 (1956)). One of ordinary skill in the art would be able to prepare polymers at a desired $T_g$.

Examples of suitable (meth)acrylate monomers include methyl(meth)acrylate, ethyl(meth)acrylate, and butyl(meth) acrylate and combinations thereof. For coatings applications, preferred (meth)acrylate monomers are combinations of butyl acrylate/methyl methacrylate; ethyl hexyl acrylate/methyl methacrylate; and butyl acrylate/ethyl hexyl acrylate/methyl methacrylate.

The first monomer may also include a vinyl ester or a combination of vinyl ester and acrylate monomers, or a combination of vinyl ester and ethylene monomers. A preferred vinyl ester is vinyl acetate; for coatings applications, a combination of vinyl acetate and butyl acrylate or a combination of vinyl acetate, butyl acrylate, and a vinyl ester of a branched carboxylic acid monomer characterized by the following formula may be used:

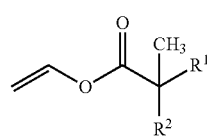

where $R^1$ and $R^2$ are each independently $C_1$-$C_{10}$-alkyl.

Examples of suitable vinyl esters of branched carboxylic acid monomers are the vinyl ester of neodecanoic acid (commercially available as VeoVa 10 monomer) and the vinyl ester of neononanoic acid (commercially available as VeoVa 9 monomer). When vinyl acetate or vinyl acetate and an acrylate monomer are used, it is preferred to include from 0.1 to 1 weight percent 2-acrylamido-2-methylpropane-sulfonic acid (AMPS).

Finally, the first monomer may also a combination of styrene and an acrylate monomer such as butyl acrylate, ethyl acrylate, and 2-ethyl hexyl acrylate or combinations thereof.

A diethylenically unsaturated crosslinking agent such as allyl methacrylate at a preferred concentration of from 0.05 to 3 weight percent based on the total monomers may be included in the first monomer addition step, and is preferably excluded in the second monomer addition step.

Subsequent to the first stage polymerization, it may be desirable to carry out a second stage polymerization step by adding second monomers to the vessel, followed by polymerization to form a second stage polymer, which, for coatings applications, preferably has a $T_g$ of less than 20° C., preferably less than 10° C., and more preferably less than 0° C.; and preferably not less not less than −40° C., and more preferably not less than −30° C. The monomers suitable for this second stage polymerization step are selected from the same group as the first stage monomers except that second stage monomers preferably contains no crosslinking monomer; it is further preferred that the second stage polymer have a $T_g$ not greater than the $T_g$ of the first stage polymer.

It is understood that the monomer used in this second stage may be the same as or different from the monomer used in the first stage polymerization. For example, the first stage monomer may be an all (meth)acrylic monomer system while the second stage may be an all (meth)acrylic monomer system or a styrene-acrylic system.

Subsequent to the final polymerization step (that is, after the first polymerization step for a one-stage encapsulating polymer or after the second polymerization step for a two-stage encapsulating polymer), the mixture is advantageously neutralized with a suitable base. The resultant formulation is a dispersion of $TiO_2$ particles preferably fully encapsulated with sodium styrene sulfonate polymer and any or all of the (meth)acrylate, styrene, vinyl ester, (meth)acrylate-styrene, (meth)acrylate-vinyl ester, and ethylene-vinyl ester based polymers.

The polymer fully encapsulated $TiO_2$ particles are advantageously formed as an aqueous dispersion of encapsulated particles. The encapsulating polymer preferably has a $T_g$ of not greater than 20° C. and is a (meth)acrylate polymer, a styrene-acrylate copolymer, or a vinyl ester-(meth)acrylate copolymer, a vinyl ester-ethylene copolymer, or a combination thereof. The encapsulating polymer further contains units of sodium styrene sulfonate as illustrated:

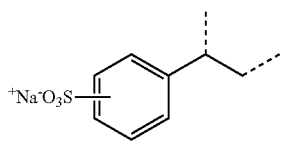

where the dotted lines represent the points of attachment to the polymer backbone. More preferably, the encapsulating polymer has a $T_g$ of less than 0° C. and is a copolymer of methyl methacrylate and butyl acrylate, and further contains units of sodium styrene sulfonate.

When only fully polymer encapsulated $TiO_2$ particles are used, the preferred opaque polymer PVC is from 20 to 25, more preferably from 21 to 23; and the preferred $TiO_2$ PVC is from 9 to 15, more preferably from 10 to 12.

It is preferred that the sum of the PVCs for opaque polymer and either fully or partially encapsulated $TiO_2$ is not more than 35.

The composition of the present invention is useful for gloss or semi-gloss paints, that is, coatings that give a Master Painters Institute gloss (MPI gloss) at 60° of at least 35 units. Consequently, extender is optional and, if used at all, is used at a PVC of not higher than 10, and preferably not higher than 5. Examples of suitable extender particles include calcium carbonate, calcium sulfate, barium sulfate, mica, clay, calcined clay, feldspar, nepheline syenite, wollastonite, diatomaceous earth, alumina silicates, aluminum oxide, silica, talc, and non-film forming polymer particles. Other examples of extenders include high $T_g$ or crosslinked solid polymer bead extenders, such as polystyrene, polyvinyl chloride, polyacrylic, and polyester beads, and combinations thereof.

EXAMPLES

The following examples are for illustrative purposes only and are not intended to limit the scope of the invention.

Table 1 shows the recipes for formulating paints using 20 PVC Opaque Polymer; Table 2 shows the recipes for formulating paints using 30 PVC Opaque Polymer. Dispersant refers to TAMOL™ 731 Dispersant; Acrylic Binder refers to RHOPLEX™ VSR-2015 Acrylic Binder; RM-2020NPR refers to ACRYSOL™ RM-2020NPR Rheology Modifier; RM-8W refers to ACRYSOL™ RM-8W Rheology Modifier; Ultra E refers to ROPAQUE™ Ultra E Opaque Polymer (TAMOL, RHOPLEX, ACRYSOL, and ROPAQUE are all Trademarks of The Dow Chemical Company or its Affiliates); $TiO_2$ refers to Ti-Pure R-746 $TiO_2$. VS refers to volume solids; OP refers to opaque polymer; Comp. 1 refers to Comparative Example 1, which contains no partially or fully encapsulated $TiO_2$; Ex. 1 is Example 1, which contains partially polymer encapsulated $TiO_2$; and Ex. 2 is Example 2, which contains fully polymer encapsulated $TiO_2$. The paint formulations were stirred for 10 min after all ingredients were added. The paints were stored at room temperature overnight after which time various test carried out and properties measured.

ABBREVIATIONS

| | |
|---|---|
| SDS = Sodium dodecylbenzene sulfonate (23%) | BA = Butyl acrylate |
| SSS = Sodium styrene sulfonate | MMA = Methyl methacrylate |
| t-BHP = t-Butyl hydroperoxide | MAA = Glacial methacrylic acid |
| EDTA = Ethylene diamine tetraacetic acid | ALMA = Allyl methacrylate |
| IAA = Isoascorbic acid | DI water = Deionized water |
| PEM = phosphoethyl methacrylate | UMA = ureido methacrylate |
| SDS = sodium dodecylbenzene sulfonate | NaPS = sodium persulfate |

The partially polymer encapsulated $TiO_2$ particles was prepared substantially as described as follows:

Intermediate 1—Preparation of a Partially Encapsulating Polymer Pre-Composite

A stage 1 monomer emulsion was prepared by mixing DI (150 g), SLS (12.6 g, 30% active), (BA, 292.3 g), (MMA, 205.1 g), ALMA (2.52 g), and MAA (4.03 g). A stage 2 monomer emulsion was prepared by mixing DI water (275 g), SLS (17.4 g, 30% active), BA (403.7 g), MMA (5.6 g), PEM (59.9 g), and UMA (12.0 g). To a 5-liter reactor, four-necked round bottom flask equipped with a paddle stirrer, a thermocouple, nitrogen inlet, and reflux condenser was added deionized water (1000 g) and SLS (50.0 g, 30% active). The contents of the flask were stirred and heated to 84° C. under $N_2$. A solution of NaPS (2.4 g) in deionized water (35 g) was then added to the reactor followed by the addition of the stage 1 monomer emulsion over 40 min. at 16.7 g/min. A solution of NaPS (1.8 g) in DI water (108 g) was fed separately to the reactor over 40 min at 1.1 g/min. After the completion of addition of stage 1 monomer emulsion the vessel containing the emulsion was rinsed with a small portion of deionized water and added into the flask. The NaPS co-feed was stopped and the reaction held at 83-86° C. for 25 min. The stage 2 monomer emulsion was then fed into the flask over 60 min at 16.7 g/min. The NaPS co-feed was re-started and fed over 60 min at 1.1 g/min. After the completion of addition of stage 2 monomer emulsion, the vessel containing this emulsion was rinsed with a small portion of deionized water and fed into the flask. The contents of the flask were maintained at 84-86° C. for 5 min, after which time the batch was cooled. When the batch temperature reached 80° C., a solution of aqueous ammonia (16.5 g, 28% conc.) in deionized water (18.5 g) was added and rinsed. The vessel containing the ammonia was rinsed with deionized water (5 g) added to the flask. The flask was further cooled to 65° C., at which temperature redox pair was added. The batch was then cooled to room temperature.

When the temperature reached <50° C., aqueous ammonia (21.8 g, 28% concentrated) was added. The particle size of the aqueous dispersion of the partially encapsulated composite ((pH=8.1)) was 64 nm, with a solids content of 39.1%. A portion of this pre-composite was used to prepare examples 1A, 1B, and 1C.

Intermediate 2—Preparation of an Aqueous Dispersion of Fully Polymer Encapsulated $TiO_2$ Particles An aqueous dispersion of fully polymer encapsulated $TiO_2$ particles (the fully encapsulated composite) was prepared substantially in accordance with the following procedure: To a 500-mL four-necked round bottom flask equipped with paddle stirrer, $N_2$-inlet, reflux condenser, heating mantel, and thermocouple was charged $TiO_2$-amphoteric polymer slurry (prepared essentially as described in US Pat. Pub. 20100/298483, Example 1; 197.3 g, 73% solids) along with a solution of SDS (1.5 g) mixed in DI water (10 g) and a separate solution of SSS (1.2 g in 10 g DI water). The flask was purged with $N_2$, and heated to 50° C., at which time aqueous solutions of 0.1% iron(II) sulfate (4.0 g) and 1% EDTA (0.4 g) were combined and added to the flask. After 2 min, co-feed #1 (BHP (1.6 g) dissolved in DI water (25 g)) and co-feed #2 (IAA (0.9 g) dissolved in DI water (25 g)) was fed to the flask at a rate of 0.25 g/min. Two minutes after the onset of the co-feed solution addition, a monomer emulsion (ME) prepared by mixing DI water (25.0 g), SDS (3.0 g), BA (68.0 g), and MMA (46.0 g) was fed to the reactor at a rate of 2.0 g/min at a temperature of 50° C. When the ME addition was complete, the co-feed #1 and #2 additions were continued for another 20 min until completion. The contents of the reactor were then cooled to room temperature after which time aqua ammonia (3.0 g, 14%) was added. The contents of the reactor were then filtered to remove any gel. The filtered dispersion was found to have a solids content of 61.7% with 0.01 g (~23 ppm) of dry gel removed. The polymer had a $T_g$ of −8° C., as calculated by the Fox equation. A portion of this composite was used to prepare examples 2A, 2B, and 2C.

TABLE 1

| Paint Formulations w/20 PVC Opaque Polymer | | | | | | | |
|---|---|---|---|---|---|---|---|
| Ingredient (g) | C-1A | C-1B | C-1C | Ex. 1A | Ex. 1B | Ex. 2A | Ex. 2B |
| Water | 0.95 | 0.95 | 0.95 | 4.55 | 3.35 | 0.95 | 0.95 |
| Part. Encap. Pre-Composite | 0.00 | 0.00 | 0.00 | 36.55 | 24.37 | 0.00 | 0.00 |
| Ti-Pure R-746 $TiO_2$ | 45.21 | 35.69 | 23.79 | 35.85 | 23.90 | 0.00 | 0.00 |
| Fully Encap. Composite | 0.00 | 0.00 | 0.00 | 0.00 | 0.00 | 85.08 | 56.72 |
| Dispersant | 1.12 | 1.12 | 1.12 | 0.58 | 0.76 | 0.43 | 0.66 |
| BYK 348 Surfactant | 0.15 | 0.15 | 0.15 | 0.15 | 0.15 | 0.15 | 0.15 |
| Tego Foamex 810 Defoamer | 0.07 | 0.07 | 0.07 | 0.07 | 0.07 | 0.07 | 0.07 |
| Foamstar A34 Defoamer | 0.00 | 0.00 | 0.00 | 0.07 | 0.05 | 0.00 | 0.00 |
| Grind Total | 47.51 | 37.99 | 26.09 | 77.73 | 52.59 | 86.54 | 58.46 |
| Water | 3.55 | 3.55 | 3.55 | 1.39 | 2.11 | 0.76 | 1.69 |
| Acrylic Binder | 62.03 | 66.10 | 71.19 | 32.48 | 48.77 | 18.16 | 39.23 |
| Ultra E | 18.35 | 18.35 | 18.35 | 18.35 | 18.35 | 18.35 | 18.35 |
| BYK 348 Surfactant | 0.15 | 0.15 | 0.15 | 0.15 | 0.15 | 0.15 | 0.15 |
| Tego Foamex 810 Defoamer | 0.07 | 0.07 | 0.07 | 0.07 | 0.07 | 0.07 | 0.07 |
| Ammonia (28%) | 0.12 | 0.12 | 0.12 | 0.12 | 0.12 | 0.12 | 0.12 |
| RM-2020NPR | 1.29 | 1.23 | 1.17 | 1.00 | 1.01 | 1.36 | 1.25 |
| RM-8W | 0.70 | 0.72 | 0.74 | 0.72 | 0.74 | 1.08 | 0.98 |
| Water | 21.10 | 21.37 | 21.70 | 17.87 | 19.37 | 23.20 | 22.93 |
| TOTAL | 154.87 | 149.66 | 143.14 | 149.99 | 143.36 | 149.94 | 143.33 |
| $TiO_2$ PVC | 19 | 15 | 10 | 15 | 10 | 15 | 10 |
| OP PVC | 20 | 20 | 20 | 20 | 20 | 20 | 20 |

TABLE 2

Paint Formulations w/30 PVC Opaque Polymer

| Ingredient (g) | C-1D | Ex. 1C | Ex. 2C |
|---|---|---|---|
| Water | 1.42 | 3.82 | 1.42 |
| Part. Encap. Pre-Composite | 0.00 | 24.37 | 0.00 |
| Ti-Pure R-746 TiO$_2$ | 23.79 | 23.90 | 0.00 |
| Fully Encap. Composite | 0.00 | 0.00 | 56.72 |
| Dispersant | 1.12 | 0.76 | 0.66 |
| BYK 348 Surfactant | 0.15 | 0.15 | 0.15 |
| Tego Foamex 810 Defoamer | 0.07 | 0.07 | 0.07 |
| Foamstar A34 Defoamer | 0.00 | 0.05 | 0.00 |
| Grind Total | 26.56 | 53.06 | 58.93 |
| Water | 3.08 | 1.64 | 1.21 |
| Acrylic Binder | 61.02 | 38.60 | 29.06 |
| Ultra E | 27.53 | 27.53 | 27.53 |
| BYK 348 Surfactant | 0.15 | 0.15 | 0.15 |
| Tego Foamex 810 Defoamer | 0.07 | 0.07 | 0.07 |
| Ammonia (28%) | 0.12 | 0.12 | 0.12 |
| RM-2020NPR | 1.27 | 1.12 | 1.36 |
| RM-8W | 0.74 | 0.74 | 0.98 |
| Water | 22.29 | 19.96 | 23.51 |
| TOTAL | 142.84 | 143.06 | 143.03 |
| TiO$_2$ PVC | 10 | 10 | 10 |
| OP PVC | 30 | 30 | 30 |

Kubelka-Munk S/Mil Test Method

Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The y-reflectance was measured using a BYK Gardner 45' Reflectomer in each of the scribed areas five times measuring on a diagonal starting at the top of the rectangle and the average y-reflectance recorded. A thick film draw down was prepared for each paint on Black Vinyl Charts (Leneta Form P121-10N) using a 3" 25 mil block draw down bar and the charts were allowed to dry overnight. The y-reflectance was measured in five different areas of the draw down and the average y-reflectance recorded. Kubelka-Munk hiding value S is given by Equation 1:

$$S = \frac{R}{X \times (1 - R^2)} \times \ln\frac{1 - (R_B \times R)}{1 - \frac{R_B}{R}} \quad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in$^2$.

$$X(\text{mils}) = \frac{W_{pf}(g) \times 1000(\text{mil/in})}{D(\text{lbs/gal}) \times 1.964(g/\text{in}^3/\text{lbs/gal}) \times A(\text{in})}$$

Procedure for Measuring Gloss and Burnish

A drawdown of the test sample was prepared on a Leneta 5C chart with a 3-mil Bird film applicator and the chart was allowed to dry in the constant temperature room (~25° C.) for 7 days. A BYK Gardner glossmeter was used to measure gloss at 20°, 60°, and 85°. Three measurements were taken for each sample and the average value was recorded as the pre-burnish gloss.

Using a tissue wrapped around the middle finger, the film was rubbed for 10 back-and-forth cycles by applying a reproducible force that is close to 200 g. The gloss of the burnished area was measured again and the results recorded as post-burnish gloss. Burnish was calculated as the percentage change in gloss by the following equation:

100%×(post-burnish gloss−pre-burnish gloss)/pre-burnish gloss

Hiding (S/mil), pre-burnish gloss, and burnish for Comparative Examples 1A-1D and examples 1A-1C, and 2A-2C and are shown in Table 3.

TABLE 3

Hiding, Gloss and Burnish of Tested Samples

| | TiO$_2$ PVC | OP PVC | Hiding (S/mil) | Gloss | Burnish (%) |
|---|---|---|---|---|---|
| Comp. 1A | 19 | 20 | 6.69 | 47.4 | 43.2 |
| Comp. 1B | 15 | 20 | 5.67 | 58.8 | 34.0 |
| Comp. 1C | 10 | 20 | 4.24 | 70.8 | 21.4 |
| Comp. 1D | 10 | 30 | 4.94 | 53.4 | 55.7 |
| Ex. 1A | 15 | 20 | 7.70 | 64.1 | 25.7 |
| Ex. 1B | 10 | 20 | 5.62 | 72.4 | 19.4 |
| Ex. 1C | 10 | 30 | 6.64 | 57.0 | 46.4 |
| Ex. 2A | 15 | 20 | 8.79 | 55.9 | 34.2 |
| Ex. 2B | 10 | 20 | 6.34 | 66.8 | 17.7 |
| Ex. 2C | 10 | 30 | 7.65 | 49.3 | 51.9 |

The data in Table 3 illustrates the difficulty in achieving acceptable hiding (>6.0 S/mil) and burnish resistance (<30%) for a gloss or semi-gloss paint formulation for samples containing non-encapsulated TiO$_2$ particles (Comparative Examples 1A-1D). Where hiding is acceptable, burnish resistance is poor (Comp. 1A); where burnish resistance is acceptable, hiding is poor (Comp. 1C). Where both hiding and burnish are subpar (Comp. 1B), it would be possible to improve burnish resistance by addition of extender; however, such addition would further diminish hiding and may adversely affect the gloss or semi-gloss quality of the coating. Finally, opaque polymer levels at 30 PVC (Comp. 1D) give both poor burnish and poor hiding.

In contrast, the examples of the present invention give acceptable hiding and burnish resistance for gloss or semi-gloss formulations at high opaque polymer PVC without addition any extender (Examples 1A and 2B), or give outstanding hiding and slightly subpar burnish resistance (Example 2A), or excellent burnish resistance and slightly subpar hiding (Example 1B). In the two examples where one of the properties is marginally off-spec, the problem can readily be fixed by a slight adjustment in the fully or partially encapsulated TiO$_2$ PVC, or a slight increase in opaque polymer PVC (Example 1B), or with the addition of a small amount of extender (Example 2A). In either case, it would not be necessary to lower the opaque polymer PVC to achieve gloss or semi-gloss formulations with acceptable burnish and hiding.

Of particular interest is the case where opaque polymer levels are at 30 PVC (Examples 1C and 2C). Although both examples give unacceptably high levels of burnish, the hiding is sufficiently high that a marginal lowering in opaque polymer PVC in combination with the addition of a small amount of extender would allow the formulator to achieve gloss or semi-gloss formulations with acceptable hiding and burnish resistance.

It has, therefore, surprisingly been discovered that burnish resistance and high hiding can be achieved for gloss or semi-gloss coatings formulations at a relatively high opaque polymer PVC. It is further surprising that it is not only desirable to replace fully or partially polymer encapsulated TiO$_2$ particles with opaque polymer for reasons of cost, but that reduction of polymer encapsulated TiO$_2$ particles also improves burnish resistance.

The invention claimed is:

1. A latex composition comprising:
   a) an opaque polymer having a pigment volume concentration (PVC) of from 18 to 28;
   b) fully or partially polymer encapsulated TiO$_2$ particles having a pigment volume concentration (PVC) of from 8 to 18;
   c) an extender having a pigment volume concentration (PVC) of from 0 to 10;
   d) a binder;
   e) a thickener; and
   f) water;
   with the proviso that the sum of pigment volume concentrations of opaque polymer and TiO$_2$ is not more than 40.

2. The composition of claim 1 wherein the opaque polymer has a PVC of from 20 to 25; the TiO$_2$ is fully polymer encapsulated and has a PVC of from 9 to 15; and the sum of opaque polymer PVC and TiO$_2$ PVC is not more than 35.

3. The composition of claim 2 wherein the opaque polymer has a PVC of from 21 to 23; the fully polymer encapsulated TiO$_2$ has a PVC of from 10 to 12; and the extender has a PVC of from 0 to 5.

4. The composition of claim 1 wherein the opaque polymer has a PVC of from 18 to 23; the TiO$_2$ is partially polymer encapsulated and has a PVC of from 13 to 17; and the sum of opaque polymer PVC and TiO$_2$ PVC is not more than 35.

5. The composition of claim 4 wherein the opaque polymer has a PVC of from 19 to 21; the partially polymer encapsulated TiO$_2$ has a PVC of from 14 to 16; and the extender has a PVC of from 0 to 5.

6. The composition of claim 3 wherein the polymer that fully encapsulates the TiO$_2$ particles has a T$_g$ of not greater than 20° C. and is a (meth)acrylate polymer, a styrene-acrylate copolymer, or a vinyl acetate-(meth)acrylate copolymer, or a combination thereof, wherein the encapsulating polymer further contains units of sodium styrene sulfonate.

7. The composition of claim 6 wherein the polymer that fully encapsulates the TiO$_2$ particles has a T$_g$ of not greater than 0° C. and is a copolymer of methyl methacrylate and butyl acrylate, and further contains units of sodium styrene sulfonate.

8. The composition of claim 6 which further includes an amphoteric polymer adsorbed to the surface of the TiO$_2$ particles, which amphoteric polymers contains amine functionality and sulfur acid functionality.

* * * * *